(12) United States Patent
Anders

(10) Patent No.: US 6,755,466 B1
(45) Date of Patent: Jun. 29, 2004

(54) HUNTER'S CHAIR

(76) Inventor: Keith Anders, 7421 Spanish Oak Dr., Lago Vista, TX (US) 78645

( * ) Notice: Subject to any disclaimer, the term of this patent is extended or adjusted under 35 U.S.C. 154(b) by 0 days.

(21) Appl. No.: 10/421,516

(22) Filed: Apr. 23, 2003

Related U.S. Application Data

(60) Provisional application No. 60/383,864, filed on May 28, 2002.

(51) Int. Cl.[7] .......................... A47C 7/62; A47B 91/08; F16M 11/28
(52) U.S. Cl. .............................. 297/217.7; 297/188.04; 297/188.07; 297/344.12; 297/344.18; 297/440.1; 297/445.1; 297/451.4; 297/451.5; 248/188.7
(58) Field of Search .......................... 297/217.7, 440.1, 297/451.4, 451.5, 451.8, 445.1, 188.04, 188.07, 344.12, 244.18; 248/188.7, 188.9

(56) References Cited

U.S. PATENT DOCUMENTS

| | | | | |
|---|---|---|---|---|
| 1,930,021 A | * | 10/1933 | Powell | 248/188.7 |
| 2,476,258 A | * | 7/1949 | Lundquist | 248/188.7 |
| 3,286,964 A | * | 11/1966 | McMahan, Jr. et al. | 248/188.7 |
| 3,286,965 A | * | 11/1966 | McMahan, Jr. | 248/188.7 |
| 3,286,966 A | * | 11/1966 | Botkin | 248/188.7 |
| 3,312,477 A | * | 4/1967 | Dirksen | 248/188.7 |
| 3,358,951 A | * | 12/1967 | Carter | 248/188.7 |
| 3,386,697 A | | 6/1968 | Helms | |
| 3,390,421 A | * | 7/1968 | Sullivan | 248/188.7 |
| 4,026,509 A | | 5/1977 | Wolters | |
| 4,073,538 A | * | 2/1978 | Hunter | 297/411.38 |
| 4,101,163 A | * | 7/1978 | Morin | 297/4 X |
| 4,474,265 A | | 10/1984 | Shinkle | |
| 4,487,345 A | * | 12/1984 | Pierce et al. | 297/188.07 |
| 4,500,137 A | * | 2/1985 | Morehouse | 297/452.21 |
| 4,520,981 A | * | 6/1985 | Harrigan | 248/188.7 X |
| 4,589,522 A | | 5/1986 | Shelton | |
| 5,110,184 A | * | 5/1992 | Stein et al. | 297/188.04 X |
| 5,171,063 A | * | 12/1992 | Stidd | 297/344.1 |
| 5,524,956 A | * | 6/1996 | Moore | 297/4 |
| 5,607,089 A | * | 3/1997 | Strum | 297/129 X |
| 5,695,099 A | * | 12/1997 | Strum | 297/129 X |
| 5,752,684 A | * | 5/1998 | Larkin | 248/188.7 |
| 5,782,531 A | * | 7/1998 | Shindle | 297/188.04 X |
| 5,906,343 A | * | 5/1999 | Battey et al. | 248/188.7 |
| 5,964,436 A | * | 10/1999 | Battey et al. | 248/188.7 |
| 5,996,738 A | | 12/1999 | Nelsen | |
| 6,116,183 A | * | 9/2000 | Crow et al. | 297/451.5 |
| 6,290,191 B1 | * | 9/2001 | Hendricks et al. | 248/188.7 X |
| 6,517,043 B1 | * | 2/2003 | Cahill | 248/188.7 X |
| 6,626,404 B2 | * | 9/2003 | Kleinikel et al. | 248/188.7 |

* cited by examiner

Primary Examiner—Peter M. Cuomo
Assistant Examiner—Rodney B. White
(74) Attorney, Agent, or Firm—Kenneth L Tolar

(57) ABSTRACT

A hunter's chair specifically designed for use in hunting blinds and/or tree stands includes a cushioned seat member with a cushioned backrest portion vertically extending therefrom. On the rear surface of the backrest portion is a pouch for receiving accessory items. Extending from the bottom surface of the seat member is a telescoping leg having a base structure on the lower end thereof The base structure includes a plurality of radially extending arms, each having an aperture at a distal end for receiving a fastener means to secure the chair to a support surface. A lever on the lower surface of the seat member operates a pneumatic lift assembly that extends and retracts the telescoping leg to adjust the height of the seat member.

5 Claims, 1 Drawing Sheet

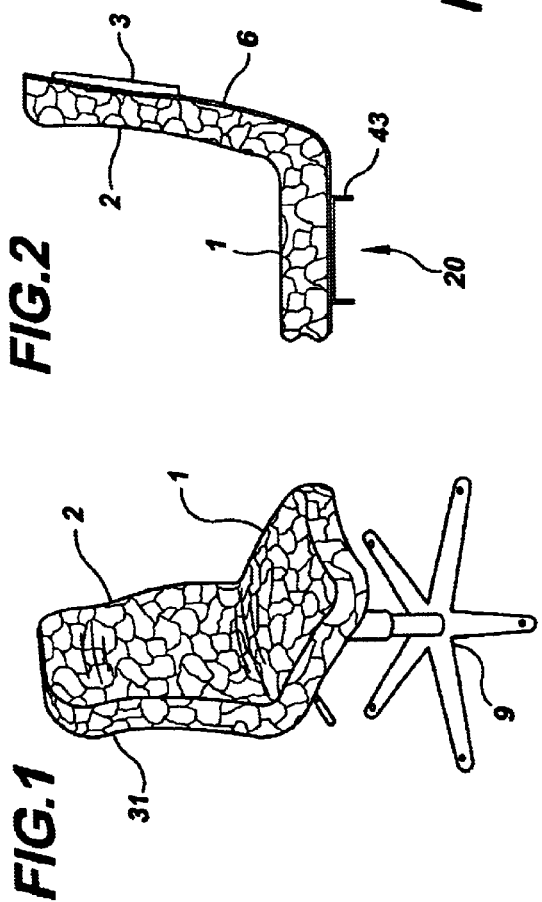
FIG.1
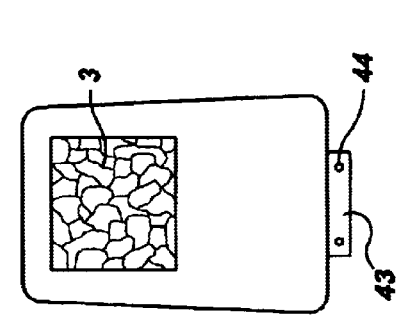
FIG.2
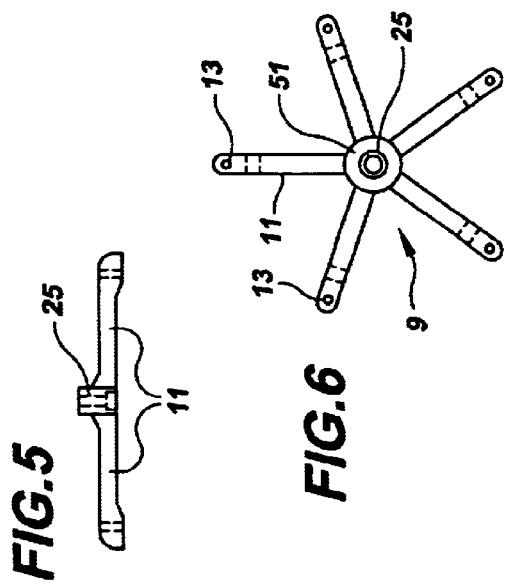
FIG.3
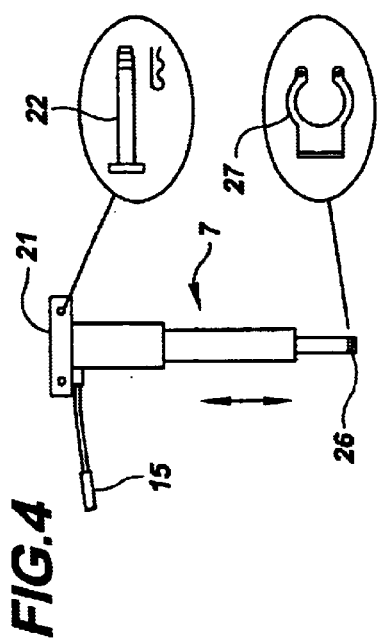
FIG.4
FIG.5
FIG.6

HUNTER'S CHAIR

CROSS-REFERENCE TO RELATED APPLICATIONS

This application is claiming the benefit of Provisional Application No. 60/383,864 filed on May 28, 2002.

BACKGROUND OF THE INVENTION

The present invention discloses a hunter's chair, designed particularly for use in hunting blinds or tree stands, that is more comfortable than conventional hunter's chairs.

DESCRIPTION OF THE PRIOR ART

Hunters typically use hunting blinds or tree stands, which conceal the hunter from his or her prey but do not obstruct the hunter's view. Typically, the hunter sits on the blind floor, an ice chest or a low profile, foldable chair, all of which are uncomfortable.

Although a myriad of chairs for hunting blinds and the like exist in the prior art, none have been specifically designed for the convenience and comfort according to the present invention. For example, U.S. Pat. No. 4,589,522 issued to Shelton discloses a tree stand chair including a pair of angled legs with a cross member that maintains the legs in spaced relationship. A seat portion includes a pair of legs pivotally connected to the angled legs. U.S. Pat. No. 4,474,265 issued to Shinkle discloses a tree chair including a U-shaped frame secured to an elongated rectangular padding that may be folded into a seat portion and a backrest portion. The chair is secured to a tree with strapping and ties.

U.S. Pat. No. 4,026,509 issued to Wolters discloses a telescoping spindle for a chair including a locking mechanism that can be manipulated between a swivel and a height-adjustment mode. Accordingly, with the lock in a first position, swiveling the seat in either of two directions raises or lowers the seat. With the lock in a second position, a seated user can freely swivel the seat without affecting the height thereof.

U.S. Pat. No. 3,386,697 issued to Helms discloses a chair having a seat that is raised and lowered by rotation.

U.S. Pat. No. 5,996,738 issued to Nelsen discloses a tree-climbing stand including an upper climbing platform and a lower, foot-climbing platform. A seat and accompanying frame assembly are secured to the upper platform.

Although numerous hunting chairs exist in the prior art, none include all of the features of the present invention, particularly a chair having a padded seat and backrest portion that is configured to fixedly mount to a hunting blind floor. Additionally, the seat and backrest are encapsulated with camouflage material so that the chair is not conspicuous to nearby prey. Finally, the present invention is formed of multiple, detachable portions allowing it to be easily stored or transported to a hunting site.

SUMMARY OF THE INVENTION

The present invention discloses a hunter's chair designed primarily for use in hunting blinds or tree stands. The device includes a seat member with a backrest portion extending vertically therefrom. Both the seat member and backrest portion include an outer cover completely encapsulating a cushion to maximize comfort for a user sitting thereon. On the rear surface of the backrest portion is a pouch for receiving accessories such as flashlights, tools, ammunition, etc. Extending from the lower surface of the seat member is a telescoping leg having a base structure removably fastened to the lower end thereof. A height adjustment lever is mounted on the leg that operates a pneumatic lift mechanism for automatically extending and retracting the telescoping leg thereby adjusting the height of the seat member. The base structure includes a plurality of radially extending arms, each having an aperture at a distal end thereof. The apertures receive screws, nuts, bolts and similar fasteners to mount the chair to a support surface such as blind flooring, a vehicle, a deer stand and the like.

It is therefore an object of the present invention to provide a chair specifically designed for use in hunting blinds or tree stands.

It is another object of the present invention to provide a hunting blind chair that is lightweight, comfortably and easy-to-use.

It is yet another object of the present invention to provide a hunting blind chair that is vertically adjustable to accommodate varying size users.

It is yet even another object of the present invention to provide a hunter's chair that can be conveniently mounted to a support structure. Other objects, features, and advantages of the present invention will become readily apparent from the following detailed description of the preferred embodiment when considered with the attached drawings and the appended claims.

BRIEF DESCRIPTION OF THE DRAWINGS

FIG. 1 is a perspective view of the hunter's chair according to the present invention.

FIG. 2 is a side view of the chair.

FIG. 3 is a rear view of the chair.

FIG. 4 is a rear, isolated view of the telescoping leg.

FIG. 5 is a side, isolated view of the base structure.

FIG. 6 is a top view of the base structure.

DESCRIPTION OF THE PREFERRED EMBODIMENT

The present invention discloses a hunter's chair designed primarily for use in hunting blinds or tree stands. The device includes a chair member having a seat member 1 with a backrest portion 2 extending vertically therefrom. Preferably, the seat member and backrest portion are unitary though they could be separately attached components, if desired. Both the seat member and backrest portion are formed of an outer cover 31 completely encapsulating a cushion to maximize comfort for a user sitting thereon. The outer cover is preferably constructed with a camouflage material so as to be inconspicuous to nearby prey.

On the rear surface of both the backrest portion and seat member is a rigid layer 6 that provides structural integrity to the chair. The portion of the rigid layer overlaying the backrest portion includes a pouch 3 for receiving accessories such as flashlights, tools, ammunition, etc. The pouch is selectively enclosable with hook and loop fasteners or similar means.

On the lower surface of the seat member is a substantially U-shaped bracket 20 for removably securing the chair member to a substantially U-shaped mounting plate 21 on a telescoping support leg 7. Both the plate and bracket each have front and rear flanges 43 with apertures 44 thereon for receiving locking pins 22 or similar means to secure the chair member to the leg. A height adjustment lever 15 extends from the leg that operates an internal pneumatic lifting means for automatically extending and retracting the leg thereby raising and lowering the chair member.

The lower end of the telescoping leg is removably fastened to a base structure 9. The base structure includes a hub 51 having a plurality of radially extending arms 11, each having an aperture 13 at a distal end thereof. The apertures receive screws, nuts, bolts and similar fasteners to mount the chair to a support surface such as blind flooring, a vehicle, a deer stand and the like. The hub includes a central bore 25 into which the lower end of the support leg fits. The lower end of the leg includes an annular channel 26 circumferentially formed thereon for receiving a C-clip 27 to retain the leg within the hub. When the leg is completely inserted into the bore, the channel will be exposed allowing the clip to be removed and attached.

To use the above described device, a user transports the chair to a desired location and assembles the components by securing the chair member to the support leg and securing the leg within the base hub. By lifting the seat member, a user activates the pneumatic lifting means which fills with air to maintain the seat member at a desired height. Depressing the handle activates an internal bleed valve to disperse air thereby lowering the seat member.

The present invention is not to be limited to the exact details of construction and enumeration of parts as detailed above. Furthermore, the size, shape and materials of construction can be varied, as desired, without departing from the spirit of the present invention.

Although there has been shown and described the preferred embodiment of the present invention, it will be readily apparent to those skilled in the art that modifications may be made thereto which do not exceed the scope of the appended claims. Therefore, the scope of the invention is only to be limited by the following claims.

What is claimed is:

1. A hunter's chair comprising:
   a chair member having a backrest portion and a seat portion, said seat portion having a lower surface;
   a telescoping support leg having an upper end and a lower end, said upper end removably secured to the lower surface of said seat portion;
   a base structure removably secured to the lower end of said support leg, said base structure including a plurality of radially extending arms, each of said arms terminating at a distal end, each of said arms including an aperture adjacent the distal end thereof, each of said apertures receiving a fastener to secure said base structure to a supporting surface;
   a hub centrally disposed on said base structure, said hub having a bore;
   an annular channel adjacent the lower end of said leg, said lower end of said leg extending through said bore;
   a C-clip received within said channel to retain said leg within said hub.

2. The chair according to claim 1 wherein said backrest portion and said seat portion are padded and encapsulated with a camouflage material.

3. The chair according to claim 1 wherein said backrest portion includes a rear surface having a storage pouch mounted thereon, said pouch selectively enclosable with a fastener.

4. The chair according to claim 1 further comprising a lifting means for automatically extending and retracting said telescoping leg to raise and lower said chair member.

5. The chair according to claim 1 further comprising:
   a bracket secured to the lower surface of said seat member, said bracket having at least one aperture;
   a plate secured to the upper end of said telescoping leg, said plate having at least one aperture aligned with said bracket aperture;
   a fastener means received within said plate aperture and said bracket aperture for removably securing said chair member to said support leg.

* * * * *